United States Patent [19]
Hombrecher

[11] 3,786,229
[45] Jan. 15, 1974

[54] THERMOSTATICALLY CONTROLLED ELECTRIC SOLDERING IRON

[75] Inventor: Friedrich Hombrecher, Wertheim/Main, Germany

[73] Assignee: Ersa Ernst Sachs KG, Wertheim/Main, Germany

[22] Filed: May 30, 1972

[21] Appl. No.: 257,802

[30] Foreign Application Priority Data
July 6, 1971 Germany............... P 21 34 560.8

[52] U.S. Cl................ 219/241, 219/236, 219/238, 219/512, 228/51
[51] Int. Cl. ..................... H05b 1/02, B23k 3/04
[58] Field of Search.......... 219/236–239, 241, 512 228/51-55

[56] References Cited
UNITED STATES PATENTS
| | | | |
|---|---|---|---|
| 3,566,074 | 2/1971 | Adamson | 219/241 |
| 2,475,376 | 7/1949 | Darling | 219/241 |
| 3,697,724 | 10/1972 | Hombrecher | 219/241 |

FOREIGN PATENTS OR APPLICATIONS
| | | | |
|---|---|---|---|
| 1,173,824 | 12/1969 | Great Britain | 219/241 |
| 663,214 | 12/1951 | Great Britain | 219/241 |

*Primary Examiner*—A. Bartis
*Attorney*—John J. McGlew et al.

[57] ABSTRACT

An electric soldering iron comprises, a tubular housing having a soldering element therein with a forward tip portion which projects out of the housing and a core portion which is located in the housing within an electrical resistance heating element. A switch for regulating the current to the heating element is actuated by a control rod which comprises an elongated rod member connected to a tongue portion of a material of good thermal conductivity and high thermal stability, such as refined steel, silver or nickel, which rides in a longitudinal slot defined along the length of the core so that the tongue is located adjacent the tip portion which projects from the housing. The rod is of a low thermal coefficient of expansion and its movement is influenced by the changes of temperature of the solder heating element tip portion to actuate the switch contained in the housing.

6 Claims, 6 Drawing Figures

PATENTED JAN 15 1974  3,786,229
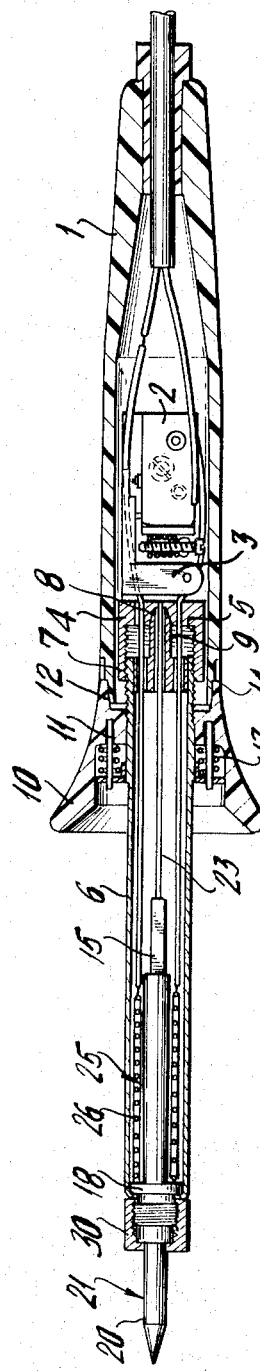
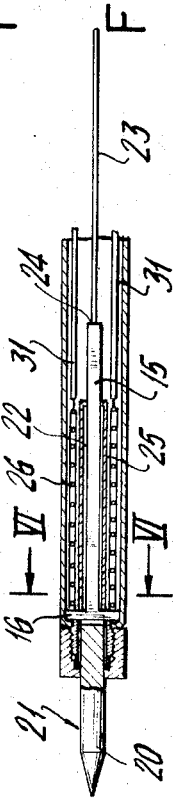
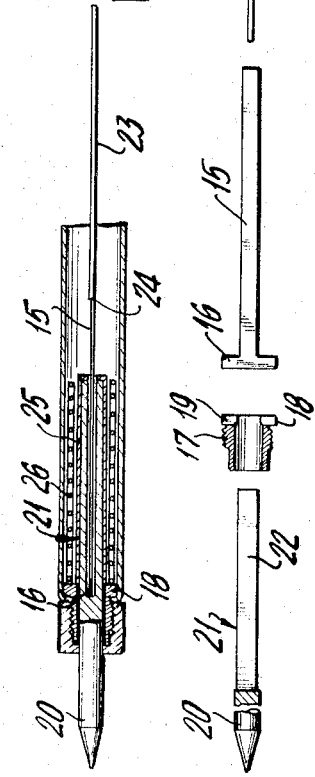
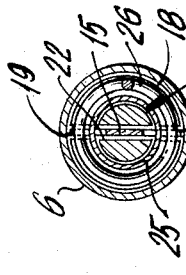
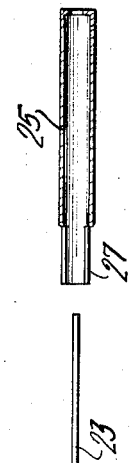
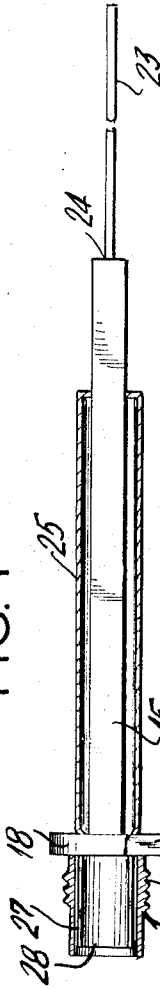
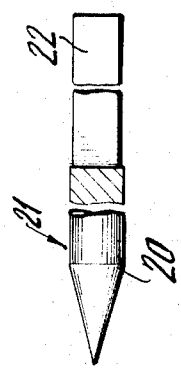

THERMOSTATICALLY CONTROLLED ELECTRIC SOLDERING IRON

BACKGROUND OF THE INVENTION

1. Field of the Invention

This invention relates in general to the construction of soldering devices and, in particular, to a new and useful soldering device having a switch-actuated heating element which is controlled by a microswitch in accordance with the movement of an elongated control rod which has a tongue portion riding in a slot of the solder heating element core.

2. Description of the Prior Art

The known electric soldering iron includes a heating core which forms a thermal control device which is rigidly connected with the front end of a tubular shaft having a low thermal coefficient of expansion so that the shaft can expand inside the heating element and move in longitudinal directions. The coaxially arranged control rod or shaft is secured in a bore of the heating core. The nozzle portion of the solder heating element bears with an end flange against the end of the heating core which is designed as a threaded head, and makes a good thermal contact by the pressure engagement of a box nut. The solder heating element comprises a nozzle portion and a heating core comprising a copper material to ensure a good heat conduction between the core and the nozzle. It was found that a heating core of copper, even if its surface is corrosion-resistant, for example, by being aluminized or nickelplated, will no longer ensure the disconnection of the heating element at a set temperature even after a relatively short operating time because the switch point is subjected to changes which can no longer be controlled. This is true because the heating core of copper, which is used as a connecting device, changes in its structure and has the effect that it influences the thermal expansion of the heating core. In most cases, the disconnection is effected by the microswitch after prolonged use of the soldering iron at a higher temperature than the set value. This results in a slow rise of the temperature and a displacement of the adjusted switching point. The temperature rise appears during the use of the soldering iron and causes a premature failure of the heater because of the adjusted switch point which it produces.

On the other hand, it is not readily possible to make the otherwise reliable copper heating core of a structurally more stable material, such as silver or nickel. Nickel has too low a thermal conductivity compared to copper, and silver is to expensive In addition, the known electrical soldering irons have bimetal regulators which also have insufficient switching sensitivity and switching accuracy.

SUMMARY OF THE INVENTION

The invention provides an electric soldering iron which avoids the use of a connecting device of copper but still maintains a good thermal conductivity of copper to the nozzle and provides an improved switching sensitivity as well as improved switching accuracy. With the invention, a metal tongue is arranged so that it moves in an oblong slot extending longitudinally along the heating core of the nozzle. The metal tongue is connected at its inner end to a control rod which actuates a switching device for controlling the heating element. This has the advantage that the connecting device which is designed as a tongue can be made of another better material than copper, while the heating core can still comprise copper. An extremely good heat transfer from the heating core to the tongue is ensured over practically its entire length because the tongue is disposed within the core slot and it, therefore, responds with high switching sensitivity and switching accuracy during heating of the soldering iron and it also reacts immediately to the heat given off by the nozzle. Another advantage is that the tongue can be guided and only a very small lateral clearance of motion has to be maintained. The mechanical advantage comprises the support of the tongue inside the slot of the core and the thermal advantage comprises an optimum heat transfer to the tongue. Since the tongue is heated through the heating core and the nozzle, an exact switching point is obtianed which exists both during the heating and during the withdrawal of the heat. The disadvantages displacement of the switching point no longer takes place.

The control rod tongue is preferably provided at its end which is opposite to its connection to the control rod with a crossbar which extends into the slot of a threaded head and secured there. The existing housing or carrier tube for the filament winding is slotted diametrically at its front end up to the crossbar and inserted into the threaded head. The oblong slot in the heating core extends up to the crossbar of the tongue. The heating core can thus be inserted into the carrier tube over the tongue up to the crossbar and be locked in this position. The crossbar of the tongue can be fixed and welded in the slot of the threaded head. In this way, the threaded head forms a unit with the tongue. The tongue arranged in the oblong slot is protected by the carrier tube for the heater. The oblong slot is arranged centrally in the heating core so that equal cross-sectional halves are obtained at both sides of the tongue. The heat can thus be influenced equally well from both sides.

The carrier tube is advantageously connected in its inserted position with the threaded head by spot welding. This unit also contains the carrier tube. The tongue is preferably longer than the longitudinal slot and the control rod is welded to the end of the tongue which projects out of the slot. The diameter of the control rod can therefore be selected slightly greater than the plate thickness of the tongue which is made to only a few tenths of a millimeter. The free end of the control rod is preferably guided in a guide bushing arranged in the housing of the device in the handle portion and directly in front of the control member for actuating a microswitch. In this way, any thermally caused displacement of the thin tongue is transmitted with high precision to the microswitch.

The tongue comprises a material that is unaffected by temperature changes, preferably of refined steel, but it can also comprise a silver or a nickel or other similar material. Since the material portion of the tongue is extremely small, the costs of its manufacture are not particularly great regardless of the material which is selected.

The slotting of the heating core, of the carrier tube for the heater and of the threaded head is a very simple operation. The assembly of the parts which form the unit is also very simple. The heating core of the nozzle is inserted into the carrier tube and is held in a self-locking arrangement through the tongue. A box nut is threaded over a head portion arranged within the housing tube to hold the parts in an assembled condition. The box nut may advantageously be of a material of a very low coefficient of thermal expansion, such as a nickel-steel alloy.

Accordingly, it is an object of the invention to provide an improved soldering device which includes a tubular housing containing a solder heating element with a forward nozzle portion projecting from the housing and a core in the housing having a longitudinally extending slot along which is movable a tongue portion of a control rod for actuating switch means to control the resistance heater.

A further object of the invention is to provide a control device for regulating the temperature of a nozzle portion of a solder heating element which may be made of an inexpensive metal material while maintaining good thermal conductivity and which has improved switching sensitivity for regulating the control of the heating element.

A further object of the invention is to provide a soldering device which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 1 is a longitudinal sectional view of an electric soldering iron constructed in accordance with the invention with some members in elevation;

FIG. 2 is a partial longitudinal sectional view of the front part of the soldering iron shown in FIG. 1;

FIG. 3 is a section similar to FIG. 2, but shown at right angles in respect thereto;

FIG. 4 is an exploded sectional view of the parts shown in FIGS. 2 and 3;

FIG. 5 is a view similar to FIG. 4 but with the nozzle part not yet inserted, and on a slightly enlarged scale; and FIG. 6 is a section taken along the line VI—VI of FIG. 2, and on an enlarged scale.

GENERAL DESCRIPTION OF THE PREFERRED EMBODIMENT

Referring to the drawings in particular, the invention embodied therein comprises, a soldering device, including a housing or hollow handle portion, generally designated 1, in which is located an actuating switch or microswitch 2, have a control or actuator 3. An insert 4 having a female thread 5 is screwed onto a tubular housing portion 6 by engagement with the male thread 7 thereof. A guide sleeve 9 is inserted into the rear end of the tubular housing portion 6, and it is provided with a guide bushing 8 which extends through a bore of the insert 4 to a location directly adjacent the actuating member 3. The housing 1 includes a forward outwardly flaring part 10 which is connected non-rotatably with the tubular housing part 6 by means of connecting pins 11. The part 10 is guided on projection 12 of the housing portion 1 and compression springs 13 press the handle part against a step 14 which bounds the projection 12. When the part 10 is rotated, the tubular shaft 6 is displaced inside the insert 4 and this displacement serves for the regulation of the temperature control by the switch 2 which is connected to a heating coil element 26.

In accordance with the invention, the temperature sensing control includes a tongue 15 having a crossbar portion 16 and which comprises a thin metal strip, such as a refined steel of a thickness of about 0.8 mm and is preferably a material which is heat-resistant and structurally stable. Refined steel is cheaper than silver and nickel so that it is given preference as a material for the tongue 15. The housing part 6 includes a flanged end into which is engaged a threaded head 17. The head 17 includes a flange 18 which abuts against the flanged end of the housing 6 and which is provided with a slot 19 that passes diametrically through the flange and into which the crossbar portion 16 of the tongue 15 is inserted and subsequently fixed by welding. The head 17 includes an external threaded portion which projects out of the end of the housing part 6 and is held in position by an internally threaded nut 30.

Heat transmission is effected by the soldering heating element which includes a nozzle porition 20 and a heating core portion 21. The heating core portion 21 has a longitudinally extending slot 22 which is centrally arranged therein and which is slightly wider than the thickness of the tongue 15. The tongue 15 is movable in the slot 22 in the assembled state and it has a free expansibility. The control rod 23 is butt-welded to the end of the tongue 15 at the location 24 and it has a slightly greater diameter than the thickness of the tongue. The control rod 23 may have a diameter, for example, of 1.2. mm. The control rod 23 slidably passes through a bore of the guide bushing 8.

The tongue 15 is somewhat narrower than the width of the oblong slot 22 in the heating core 21 but it is longer than the oblong slot so that the welded joint 24 is located beyond the slot in the assembled state as shown in FIGS. 1, 2, and 3. During assembly, the carrier tube 25 for the filament winding or resistance heater 26 is inserted from the rear over the tongue 15 into the threaded head 17 and secured there by spot welding. The carrier tube is diametrically slotted at its forward end up to the crossbar 16 as indicated at 27. The welded joints are shown at 28 in FIG. 5.

The threaded head 17 carries the male thread 29 for the box nut 30 by which the inwardly flanged end of the tubular shaft is tightened against the flange 18 of the threaded head. The nozzle 20 extends through the bore of the nut outwardly from the housing. The core portion 21 bears with sufficient elasticity on the carrier tube 25. Further fastening of the nozzle 20 in the threaded nut head is not necessary. The nozzle can be replaced by simply pulling it out. The filament winding or heating coil 26 is not shown in FIG. 6 for reasons of clarity. The two electrical feed wires of the filament winding are designated 31. The free end of the control rod 23, which projects from the guide bushing 8 is directly in front of the control member 3 of the microswitch 2 which is actuated at the present switch point.

While a specific embodiment of the invention has been shown and described in detail to illustrate the application of the principles of the invention, it will be understood that the invention may be embodied otherwise without departing from such principles.

What is claimed is:

1. An electric soldering iron comprising a tubular housing, a soldering element removably secured to said housing and including a forward tip projecting from said housing and a rearwardly extending core connected to said tip and arranged in said housing and having a longitudinally extending slot extending through its whole diameter and over a major portion of its length and with the rearward end of the slot being open, an electric resistance heating element around said core for heating said core, a control rod having a low coefficient of expansion relative to said housing and supported therein so as to be expandable and contractable for movement in longitudinal directions, one end of said rod being arranged in said housing adjacent the rearward end of said core, and a tongue of a material of good thermal conductivity and high thermal stability connected to and movable with said control rod and extending along substantially the whole length of said slot, and having its other end located adjacent the forward end of said slot, guide means in said housing for guiding said control rod for longitudinal movement within said housing, and a switch secured in said housing in the path of movement of the other end of said control rod and connected to said resistance heating element for actuating said element in response to expansion and contraction of said rod.

2. An electric soldering iron, according to claim 1, including a carrier tube for said electrical resistance element surrounding said core portion and secured to said housing, a threaded head engaged over and secured to said carrier tube and having a flange portion at one end with a diametric slot, said tongue having an end forming a cross bar engaged in the slot of said threaded head, said tubular housing having an inwardly directed flange at its forward end, said threaded head projecting outwardly from the forward end of said housing, and a box nut threaded onto said head having an opening through which said tip extends, said housing flange being clamped between the flange portion of said head and said box nut so as to secure said tongue to said tubular housing.

3. An electric soldering iron, according to claim 1, including a carrier tube for said electrical resistance heating element, said heating element comprising a coil surrounding said carrier tube, said carrier tube surrounding over said core, said guide means comprising a guide bushing in said housing adjacent said switch having a bore through which said control rod is slidable.

4. An electric soldering iron, according to claim 1, wherein said tongue comprises a refined steel material.

5. An electric soldering iron, according to claim 1, wherein said tongue comprises silver.

6. An electric soldering iron, according to claim 1, wherein said tongue comprises nickel.

* * * * *